March 29, 1932.  H. L. JOHNSTON  1,851,584

FOOD HANDLING APPARATUS

Filed April 18, 1930   2 Sheets-Sheet 1

INVENTOR
Herbert L. Johnston
BY Marechal and Rae
ATTORNEYS

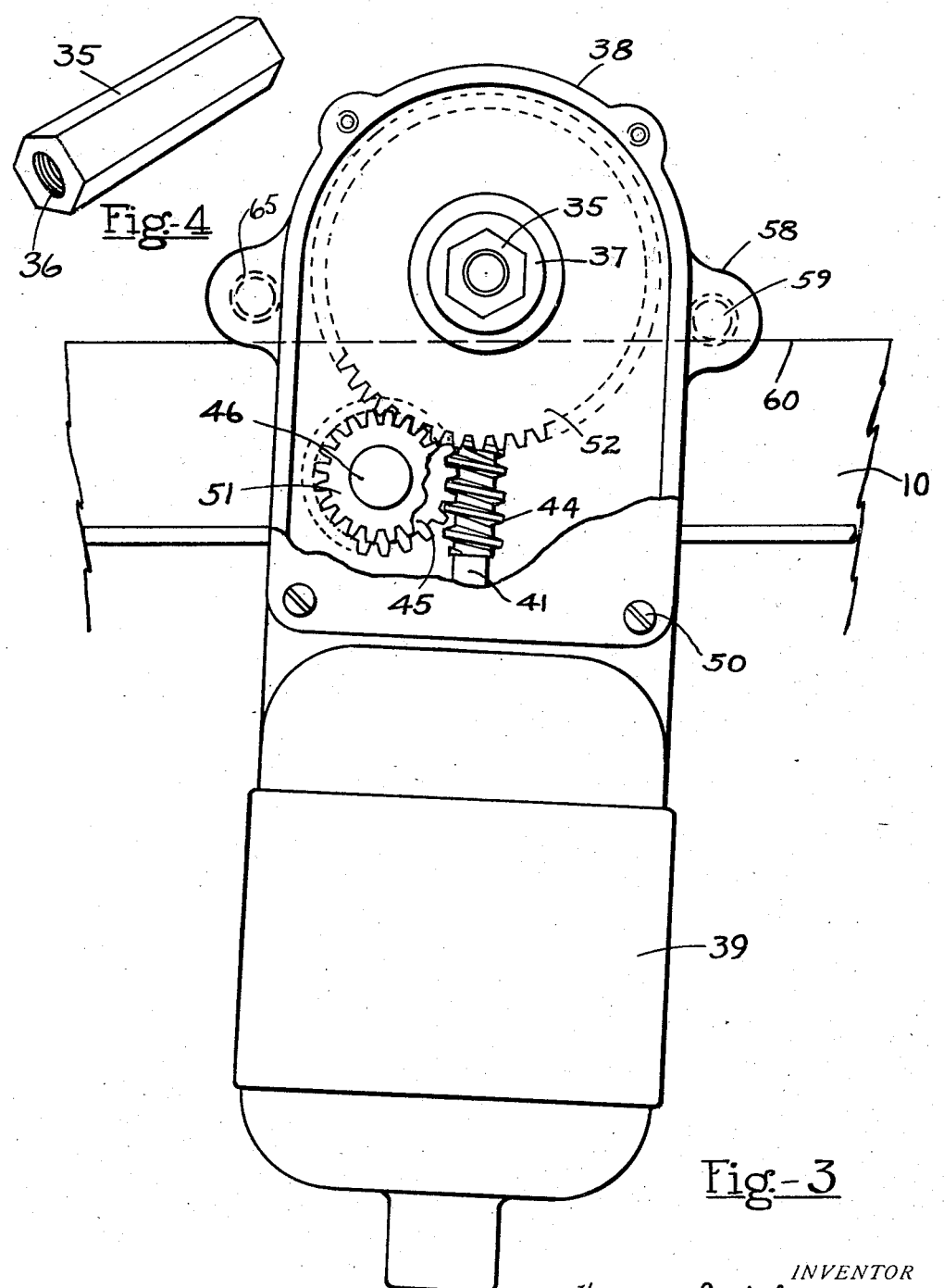

Patented Mar. 29, 1932

1,851,584

UNITED STATES PATENT OFFICE

HERBERT L. JOHNSTON, OF TROY, OHIO, ASSIGNOR TO THE HOBART MANUFACTURING COMPANY, OF TROY, OHIO, A CORPORATION OF OHIO

FOOD HANDLING APPARATUS

Application filed April 18, 1930. Serial No. 445,321.

This invention relates to food handling apparatus, and particularly to ice cream freezers and driving means therefor.

One of the principal objects of the invention is to provide a food handling apparatus, such as an ice cream freezer, of simple construction, having a readily detachable motor drive which is easily and quickly inserted in place and supported in effective driving relation with movable freezer parts.

Another object of the invention is to provide a compact self-contained motor drive unit which is light in weight, is simple in construction, which may be interchangeably used on different kinds of food handling apparatus, which may be quickly and easily inserted in place and detached, and which is provided with simple and effective means for supporting and holding the drive unit in proper operating position.

Other objects and advantages of the invention will be apparent from the following description, the accompanying drawings and the appended claims.

In the drawings, which disclose a preferred embodiment of the invention—

Fig. 3 is a partial end elevational view of the device of Fig. 1, a portion of the cover of the motor drive unit being broken away to illustrate the construction thereof; and Fig. 4 is a perspective view of a detail.

Figure 2:
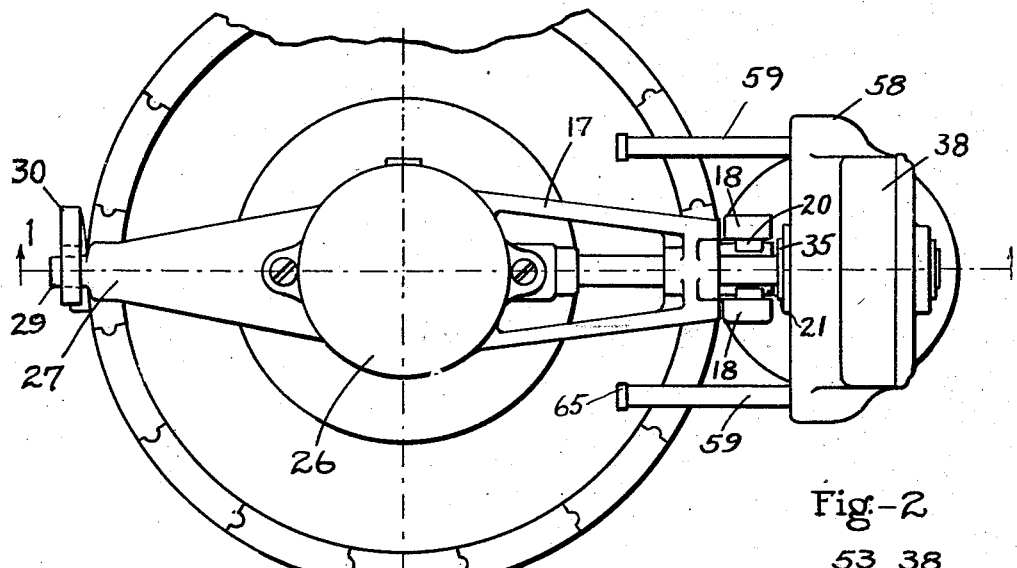
Fig. 2 is a plan view of the device of Fig. 1.
Figure 1:
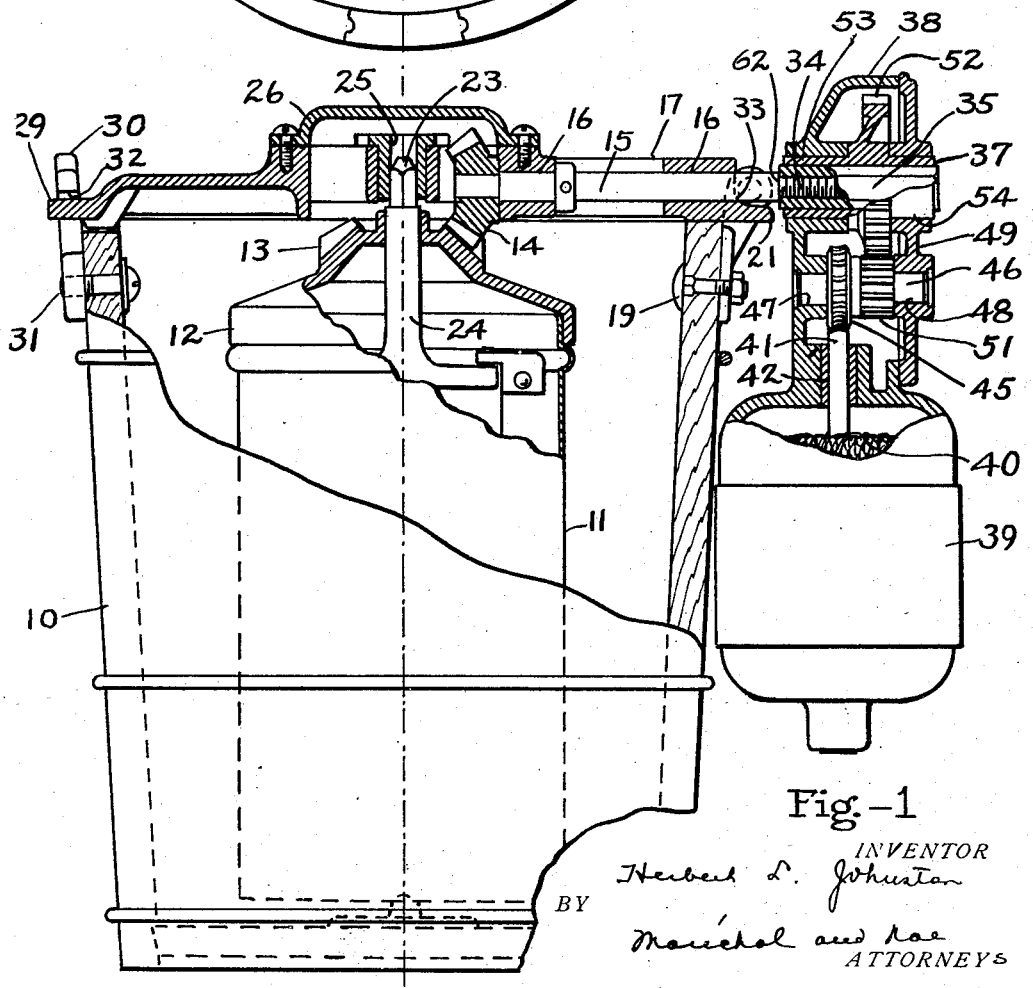
Fig. 1 is a side elevational view of an ice cream freezer embodying the present invention, parts being broken away and in section on the plane of the line 1—1 of Fig. 2 to illustrate the construction thereof.

Referring to the drawings, in which like characters of reference designate like parts throughout the several views thereof, the numeral 10 designates the container or bucket of an ice cream freezer within which a food can 11 of the usual construction is suitably mounted. Any suitable conventional construction of ice cream freezer can be used in accordance with the present invention, so the details of construction of the freezer are not illustrated in greater detail. The invention also permits conversion of standard hand-operated freezers, such as small size domestic freezers, to power driven freezers in a simple and highly effective manner. As an example of a freezer construction to which the invention may be applied, that shown in the patent to Johnston et al. 1,492,468, dated April 29, 1924, may be used. As illustrated in the drawings, the food can 11 is provided with a removable cover 12 having a gear 13 attached thereto, and adapted to mesh with and be driven by a gear 14 mounted on a rotatable cross shaft 15. The cross shaft 15 is journalled at 16 within a yoke or cross frame 17 which is removably attached to the housing 10 of the freezer.

As shown, the yoke frame 17 extends across and is supported upon the top of bucket 10. At one side, the bucket 10 is provided with upwardly extended spaced lugs 18 bolted at 19 to the side wall of the bucket. Adjacent the upper ends of the lugs 18 are short inwardly extending circular pins 20 which are mounted in alignment and spaced sufficiently to permit the passage of shaft 15 therebetween. The yoke frame 17 carries at this end an outwardly extending flange 21 which is substantially rectangular in cross-section, this flange being adapted to be inserted when the yoke frame is held in an upwardly inclined position between the lugs 18, the opposite side edges of the flange underlying the pins 20. With the flange 21 thus inserted in position, the yoke frame is then lowered about this mounting as a pivot, care being taken to properly center the upper protruding end 23 of the freezer shaft 24 within a suitable socket 25 carried by the central portion 26 of the yoke frame 17. The freezer shaft 24 extends within the food can 11, and carries therein suitable blades, paddles or scrapers as are customarily provided in freezers of this character. The can 11 is rotatably mounted in a suitable centering lower bearing, and is adapted to be rotated by the intermeshing gears 13 and 14. The freezer shaft 24 may also be rotated, or it may be held substantially stationary within the socket 25. With the end 23 of shaft 24 properly centered within socket 25, the yoke frame 17 may then be further lowered about the pivotal mounting 18 until the opposite end 27 of the frame 17 contacts with the top of bucket 10 at an area diametrically opposite lugs 18. The yoke frame 17 is provided at this end with an outwardly projecting lip 29, and a latch 30 pivoted at 31 to the side wall of bucket 10 is adapted to swing into a position overlying this lip 29, the latch having a cam surface 32 which engages the lip and cams it downwardly into fixed position. During this lowering movement of the yoke frame, the flange 21 slides further in under the pins 20, until the final camming action of the latch 30 forces a curved surface 33 on the upper side of flange 21 into engagement with the pins 20, so that the flange 21 is wedged in between the top of bucket 10 and the pins 20. The yoke frame is thus securely held at opposite ends in operating position, while being easily and quickly removable.

The shaft 15 is provided with an extended screw-threaded end portion 34 which projects beyond the periphery of the bucket 10, and is adapted to receive a hand crank thereon, for manual operation if desired. In accordance with this invention a readily detachable power actuated driving means is provided for rotating the shaft 15 comprising a motor drive unit supported by the extended end portion 34 of the shaft 15. A connecting member or spline 35 having a polygonal cross-section, such as the hexagonal shape shown more particularly in Fig. 4, has a circular threaded bore 36 received upon the shaft portion 34. Cooperating with this member 35 and adapted to slide thereon is a motor drive unit carrying a sleeve 37 provided with a bore similar in shape to that of the outer driving surface of the member 35. This sleeve 37 is mounted for rotational movement within the housing 38 which may be an integrally extending part of the casing of the electric motor 39. The armature 40 of the motor has a shaft 41 which is rotatably mounted within the frame 38 in suitable bearings 42. The shaft 41 carries at its outer end a worm 44 which meshes with a worm gear 45 which is suitably fixed to a rotatable cross shaft 46. One end of shaft 46 is supported in a bearing 47 provided in the housing 38, and the other end is supported in a bearing 48 carried by a cover plate 49 removably attached to the housing 38 by the screws 50. There is also fixed to shaft 46 a spur gear 51 which meshes with a spur gear 52. The sleeve 37 provides a hub for gear 52 which may be formed integrally therewith or may be attached thereto in any suitable manner. The combined sleeve 37 and gear 52 is rotatably supported in bearings 53 and 54 formed in the housing 38 and cover 49 respectively. The driving connection between the spline 35 and the shaft end 34 is in such a direction that rotation of the parts tend to tighten the spline 35 on the threaded end 34. The motor unit and sleeve 36 upon insertion on the spline slide inwardly until this movement is limited, such as by contact of the motor casing with the side wall 10.

Rotational movement of the motor armature 40 is transmitted through the intermeshing gears, which form a reduction gearing, to the sleeve 37 which in turn drives the freezer shaft 15. The housing 38 is provided with outwardly extending lugs 58 into which are fitted holding means such as the pins 59 which overlie the top edge 60 of the bucket 10 when the motor is in its mounted position on the shaft 15 to prevent rotation of the motor unit about the shaft 15 when the motor drive unit is in operation. In assembling the motor drive unit for operation on a freezer, the member 35 is first screwed onto the threaded end 34 of shaft 15 until this action is limited by engagement of the member 35 with the shoulder 62 at the end of the threads. The drive unit is then slid onto the driving member and the freezer is then ready for motor operation. The motor unit may be provided with conventional electrical leads in an insulated cable (not shown) with a plug in attachment, so that it can be connected to a suitable source of electrical energy, such as a house line.

The construction described also permits the easy conversion of the usual hand-operated domestic freezers now on the market to a motor operated freezer. Such freezers are generally provided with a top drive shaft which extends beyond the side of the bucket of the freezer, such as the shaft 15 of the illustrated construction. The outer end of the shaft is generally screw-threaded to receive the usual hand-operated crank. By merely removing the hand-operated crank, inserting the spline 35 in place on this screw-threaded end, and then sliding the motor drive unit in place over the spline, the conversion is accomplished, and the freezer ready for operation as a power driven freezer. It is obvious that the spline 35 may be suitably modified as to the form or diameter of the internal bore 36 to adapt it to the various shaft ends encountered.

It is to be noted that no special mounting need be provided for the motor unit, as it is effectively supported on the extended shaft end of the freezer, the motor being suspended from this shaft end along the side wall of the bucket 10 so that substantially no additional room is needed for the operation of the freezer, and no additional modification of the freezer is necessary. The simplicity of the construction enables the average domestic user to easily make the change without the aid of special tools or specialized labor. The vertical positioning of the lugs 58 and pins 59 with relation to the axis of the shaft 15 is such as to permit the insertion of the pins 59 over the top edge 60 of the bucket 10 for the minimum distance generally encountered between the axis of shaft 15 and the top edge 60. This distance may vary somewhat for different freezers, the one shown in the drawing being for a small clearance. Where this distance is greater than the minimum distance, the pins 59 will then clear the top edge 60 by a greater amount; the operation of the motor unit will then set up a torque which will rotate the unit slightly about the sleeve 37 until one of the pins 59 contacts with the edge 60 to limit this rotative movement, the motor then operating in this slightly inclined position, as is clearly illustrated in Fig. 3.

The motor unit is thus made practically universally applicable to food handling apparatus having a container or frame, with a drive shaft mounted somewhat above the frame and extending outwardly beyond the end of the container or frame, so that the drive unit may be slipped on the end of the shaft and supported in operating position thereon, the motor casing being held against rotation thereon by interengaging surfaces between the casing and frame or container. Proper alignment of the driving connection between the motor unit shaft and the container shaft is secured by the substantial engaging surfaces between the spline 35 and the sleeve 37. The motor unit may be made small, compact and of light weight for domestic use, for example a $\frac{1}{10}$ H. P. motor being used, so that it can be easily handled; and at the same time is rugged and effectively protected against injury by the enclosing casing which confines the driven parts of the motor and the reduction gearing. The reduction gearing is designed to give a substantial speed reduction, so that conventional available motors can be used to obtain a proper rotative speed of the freezer shaft 15. While the motor drive unit in actual operation generally shows no tendency to work off of the spline 35, suitable means may be provided if desired for positively retaining the unit in operating position. One suitable form for accomplishing this comprises projections or cylindrical enlargements 65 on the ends of pins 59, so that the projection on the pins 59 which bears on the upper surface 60 of the freezer bucket during operation will engage the interior wall of the freezer bucket upon movement of the freezer unit away from the bucket to thereby positively restrain further movement of this character. In such case, sufficient clearance above the top of the freezer bucket is provided for the pins 59, so that the projections 65 will clear the upper surface 60 when the motor drive unit is inserted in place on the spline 35.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Food handling apparatus of the character described, comprising in combination, a container, a member adapted to be driven within said container, a shaft in driving interconnection with said member, a non-circular member mounted on said shaft, and a motor drive unit removably supported on said shaft, said unit having a driving sleeve of a shape corresponding to said non-circular member and adapted to receive said non-circular member and shaft in driving engagement.

2. Food handling apparatus of the character described, comprising in combination, a container, a member adapted to be driven within said container, a shaft in driving interconnection with said member, a circular end portion on said shaft, a splined member rigidly mounted on said shaft end and having a polygonal driving surface, a motor drive unit having a driving sleeve with a bore corresponding in shape to and adapted to be received on said splined member in driving engagement with said splined member and shaft, said motor drive unit being supported on said shaft end.

3. A freezer of the character described, comprising an outer container, an inner container, a cross shaft, a driving interconnection between the inner container and the cross shaft to rotate the inner container, a protruding end on said cross shaft, a splined member mounted on the protruding end of said cross shaft, a motor drive unit having a driving sleeve with a bore corresponding in shape to and adapted to be received on said splined member in driving engagement therewith, said motor drive unit being removably supported on said protruding shaft end.

4. For use with food handling apparatus of the character described having a container and a driven shaft; a motor drive unit comprising a motor, a casing therefor, a sleeve mounted in said casing and adapted to receive said driven shaft in driving engagement, a driving interconnection between said motor and said sleeve including a reduction gearing, said motor drive unit being adapted to be supported from said driven shaft, and means carried by said motor drive unit adapted to engage a cooperating part of said container to prevent rotation of the motor drive unit about the shaft during the driving of said shaft by the motor drive unit.

5. For use with food handling apparatus of the character described having a container and a driven shaft supported above the upper edge of said container, said shaft having an end extending beyond the periphery of said container; a motor drive unit removably suspended from said protruding shaft end in driving engagement therewith, and a projecting member carried by said motor drive unit and overlying the upper edge of said container to prevent rotation of the motor drive unit about the shaft during the driving of said shaft by the motor drive unit.

In testimony whereof I hereto affix my signature.

HERBERT L. JOHNSTON.